US012656911B2

(12) United States Patent
    Kim et al.

(10) Patent No.: US 12,656,911 B2
(45) Date of Patent: Jun. 16, 2026

(54) HEATER IN WHICH CAPACITIVE POWER CONTROL PATTERN IS IMPLEMENTED, AND APPARATUS THEREFOR

(71) Applicant: TERAON Co., Ltd., Seongnam-si (KR)

(72) Inventors: Yoon Jin Kim, Seongnam-si (KR); Sang Hyun Jang, Seongnam-si (KR); Hyung Jun Kim, Seongnam-si (KR)

(73) Assignee: TERAON Co., Ltd., Seongnam-si (KR)

( * ) Notice: Subject to any disclaimer, the term of this patent is extended or adjusted under 35 U.S.C. 154(b) by 929 days.

(21) Appl. No.: 17/790,940

(22) PCT Filed: Nov. 11, 2020

(86) PCT No.: PCT/KR2020/015807
    § 371 (c)(1),
    (2) Date: Jul. 5, 2022

(87) PCT Pub. No.: WO2021/141231
    PCT Pub. Date: Jul. 15, 2021

(65) Prior Publication Data
    US 2023/0030184 A1     Feb. 2, 2023

(30) Foreign Application Priority Data
    Jan. 6, 2020     (KR) ........................ 10-2020-0001196

(51) Int. Cl.
    *G06F 3/044*          (2006.01)
    *H05B 1/02*           (2006.01)
(52) U.S. Cl.
    CPC ........... *G06F 3/044* (2013.01); *H05B 1/0202* (2013.01)
(58) Field of Classification Search
    CPC .......... H05B 1/0202; H05B 3/20; H05B 3/26; H05B 3/28; H05B 3/46; H05B 2203/002;
    (Continued)

(56) References Cited

U.S. PATENT DOCUMENTS

| | | | | |
|---|---|---|---|---|
| 2016/0039265 A1* | 2/2016 | Ota | ........................... | H05B 3/12 |
| | | | | 219/202 |
| 2017/0321902 A1* | 11/2017 | Ishikawa | .............. | B60H 1/2215 |
| 2020/0236740 A1* | 7/2020 | Tanaka | ................. | B60H 1/2227 |

FOREIGN PATENT DOCUMENTS

| | | |
|---|---|---|
| JP | 2017-098048 A | 6/2017 |
| JP | 2019-184171 A | 10/2019 |

(Continued)

OTHER PUBLICATIONS

International Search Report in PCT/KR2020/015807 in 4 pages (Feb. 23, 2021).

*Primary Examiner* — Justin C Dodson
(74) *Attorney, Agent, or Firm* — Knobbe, Martens, Olson & Bear, LLP

(57)          ABSTRACT

The present disclosure relates to a heater in which a capacitive power control pattern is implemented, and an apparatus therefor. A heater comprising: first and second base materials that are separated in the vertical direction so as to have an internal space therebetween; a heater electrode pattern provided in the internal space; and a plurality of sheet-type heating elements provided in the internal space so as to be electrically connected to the heater electrode pattern, comprises a capacitance pattern for causing a change in capacitance in the region between the sheet-type heating elements according to a hovering movement above the second base material, wherein heater power to be supplied to the sheet-type heating elements through the heater electrode pattern can be controlled according to the hovering movement recognized in response to the change in capacitance.

4 Claims, 9 Drawing Sheets

(58) Field of Classification Search

CPC ........ H05B 2203/005; H05B 2203/007; H05B 2203/008; H05B 2203/01; G06F 3/044; G06F 3/0445; G06F 2203/04104; G06F 2203/04108; G06F 2203/04111; G06F 2203/04114

See application file for complete search history.

(56) References Cited

FOREIGN PATENT DOCUMENTS

| | | | |
|---|---|---|---|
| KR | 10-2016-0039415 | A | 4/2016 |
| KR | 10-2018-0115378 | A | 10/2018 |
| KR | 10-2019-0113336 | A | 10/2019 |

* cited by examiner

100A

HEATER IN WHICH CAPACITIVE POWER CONTROL PATTERN IS IMPLEMENTED, AND APPARATUS THEREFOR

TECHNICAL FIELD

The present invention relates to a heater and an apparatus therefor, and more particularly, to a heater in which a capacitive pattern for controlling power supplied to a heating body is implemented, and an apparatus therefor.

BACKGROUND ART

Film-type heaters (hereinafter, referred to as "film heaters") are compact heaters in which electrodes, heating bodies, and the like are printed on base materials and can be applied to various electrical and electronic products such as printers, copiers, heaters, ovens, cookers, and vehicles which require miniaturization and weight reduction. In this case, the film heater includes a pair of electrodes having different polarities and electrically separated from each other on one surface of a base material, and a plurality of heating bodies electrically connected in parallel to the pair of electrodes.

A conventional heater device with the film heater controls power supplied to the electrodes of the heater in response to detection signals sensed by various sensors. In this case, since a corresponding sensor detects a pressing pressure, and thus a user should directly input a corresponding pressing, there is a problem of degrading user convenience.

In addition, in the conventional heater device, the sensor implemented through an additional base material outside the film heater is implemented as a separate component above or below the film heater. Accordingly, the conventional heater device has a problem in that a thickness thereof is increased and a manufacturing cost thereof is inevitably increased.

In addition, in the conventional heater device, as a heat capacity of the film heater is increased, a decrease in a heat generation rate is induced. In particular, as the sensor is attached in a direction of heat generation, there is a problem in that sensitivity of the sensor may be degraded.

DISCLOSURE

Technical Tasks

The present invention is directed to providing a heater in which a capacitive pattern for controlling power supplied to a heating body is implemented, and an apparatus therefor.

Technical Solution

One aspect of the present invention provides a heater including a first base material and a second base material which are spaced apart in a vertical direction to have an internal space, a heater electrode pattern provided in the inner space, a plurality of sheet-type heating bodies provided in the inner space to be electrically connected to the heater electrode pattern, and a capacitive pattern in which a capacitance change occurs in a gap area between the sheet-type heating bodies according to a hovering movement above the second base material, wherein heater power supplied to the sheet-type heating bodies through the heater electrode pattern is capable of being controlled according to the hovering movement recognized in response to the capacitance change.

The capacitive pattern may include a first line and a second line which are spaced apart from each other in a horizontal direction, each of the first line and the second line may include a plurality of branch lines passing through a plurality of a gap areas, and the first branch lines connected to the first line may be disposed in parallel with the second branch lines connected to the second line in each gap area.

The first line may include a first main line and the second line includes a second main line, the first branch line and the second branch line may have a shape branching off from the first main line and the second main line, and a gap distance between the first main line and the second main line may be shorter than a gap distance between the first branch line and the second branch line in the gap area.

The heater electrode pattern may include first and second heater electrodes spaced apart from each other in a horizontal direction, the first and second heater electrodes may include a plurality of branch electrodes connected to sheet-type heating bodies, and the branch electrodes may be disposed in parallel with or perpendicular to the branch lines.

The capacitive pattern may be provided in the inner space or provided on the second base material.

The heater may further include an insulating coverlay provided in the inner space, wherein an area in which the heater electrode pattern and the plurality of sheet-type heating bodies are formed is filled with the insulating coverlay.

At least a portion of the capacitive pattern may be disposed in an empty space of the coverlay.

The heater according to one embodiment of the present invention may be implemented in the form of a film.

Another aspect of the present invention provides a heater device including (1) a power supply configured to supply heater power, (2) a first base material and a second base material which are spaced apart in a vertical direction to have an internal space, a heater electrode pattern provided in the inner space, a plurality of sheet-type heating bodies provided in the inner space to be electrically connected to the heater electrode pattern, and a heater including a capacitive pattern in which a capacitance change occurs in a gap area between the sheet-type heating bodies according to an operation above the second base material, and (3) a controller configured to control the heater power supplied to the sheet-type heating bodies through the heater electrode pattern according to a hovering movement recognized in response to a capacitance change.

Advantageous Effects

The present invention, which is configured as described above, has an advantage in that the user can control the power of the heater only with a hovering movement without a direct touch such as pressing of the heater, thereby improving the convenience to use.

In addition, according to the present invention, since the sensor part is formed such that the capacitive pattern is provided inside the heater or on the base material without a configuration of an additional base material, there is an advantage of being able to implement a heater with a more minimized thickness and to reduce the manufacturing cost by reducing the manufacturing processes.

In addition, according to the present invention, since the capacitive pattern in which the capacitance change occurs according to a hovering movement is disposed in a gap area to be spaced apart from the sheet-type heating body, there is an advantage of being able to prevent a problem that may occur between a corresponding capacitance pattern and the sheet-type heating body in advance and to suppress an increase in heat capacity due to the capacitive pattern. That is, according to the present invention, it is possible to prevent a decrease in speed of a feeling of warmth due to the capacitive pattern.

EMBODIMENTS OF THE INVENTION

The above object and means of the present invention and their effects will become more apparent through the following detailed description in relation to the accompanying drawings, and accordingly, those of ordinary skill in the art to which the present invention pertains can easily implement the technical idea of the present invention. In addition, in the following description of the present disclosure, if a detailed description of the known related art is determined to obscure the gist of the present disclosure, the detailed description thereof will be omitted.

In the present specification, terms such as "or" and "at least one" may indicate one among words listed together or indicate a combination of two or more. For example, "A or B" and "at least one of A and B" may include only one of A or B or include both A and B.

Hereinafter, exemplary embodiments of the present invention will be described in detail with reference to the accompanying drawings.

Figure 1:
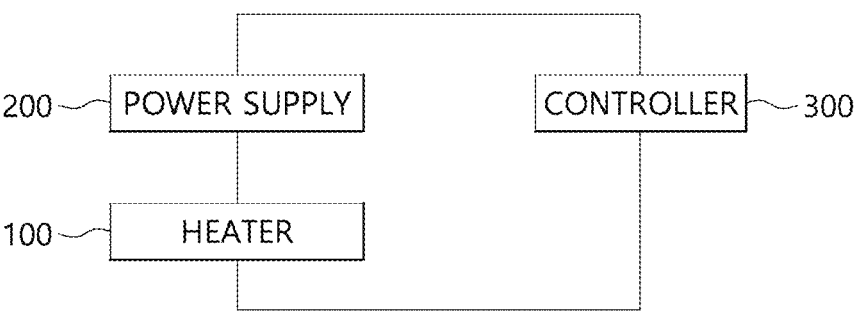
FIG. 1 is a schematic block diagram illustrating a heater device according to one embodiment of the present invention.

FIG. 1 is a schematic block diagram illustrating a heater device according to one embodiment of the present invention.

A heater device according to one embodiment of the present invention is a device for generating heat and controlling the heat and may be applied to various electrical and electronic products such as printers, copiers, heaters, ovens, cookers, and vehicles. Referring to FIG. 1, the heater device according to one embodiment of the present invention may include a heater 100, a power supply 200, and a controller 300.

Figure 2:
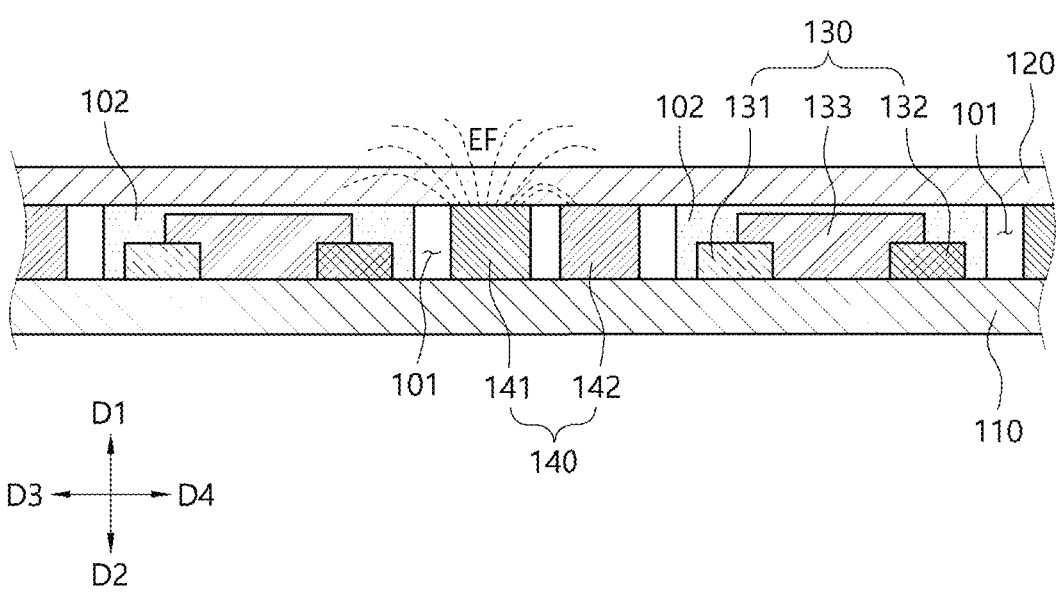
FIG. 2 is a side cross-sectional view illustrating a heater (100A) according to a first embodiment of the present invention.
Figure 3:
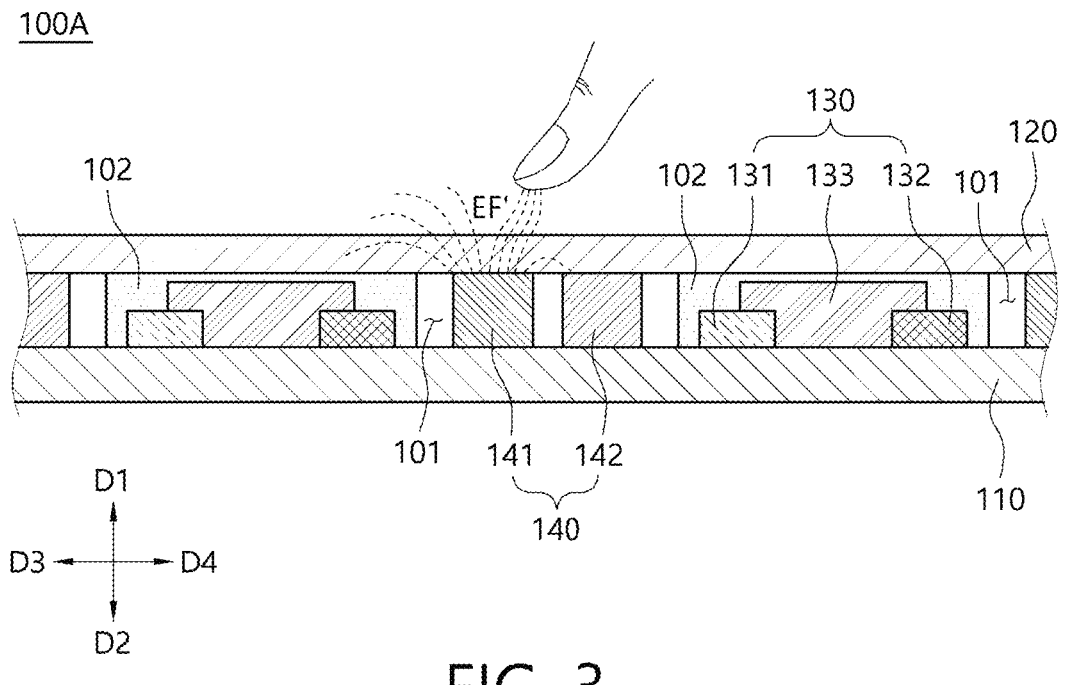
FIG. 3 is a side cross-sectional view illustrating a hovering movement state on the heater (100A) according to the first embodiment of the present invention.
Figure 4:
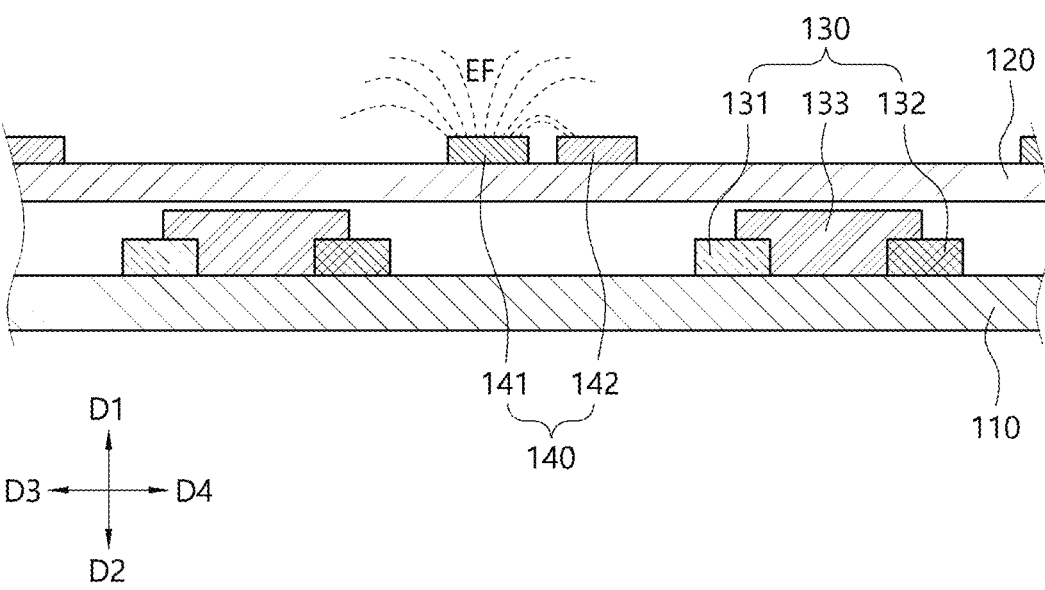
FIG. 4 is a side cross-sectional view illustrating a heater (100B) according to a second embodiment of the present invention.
Figure 5:
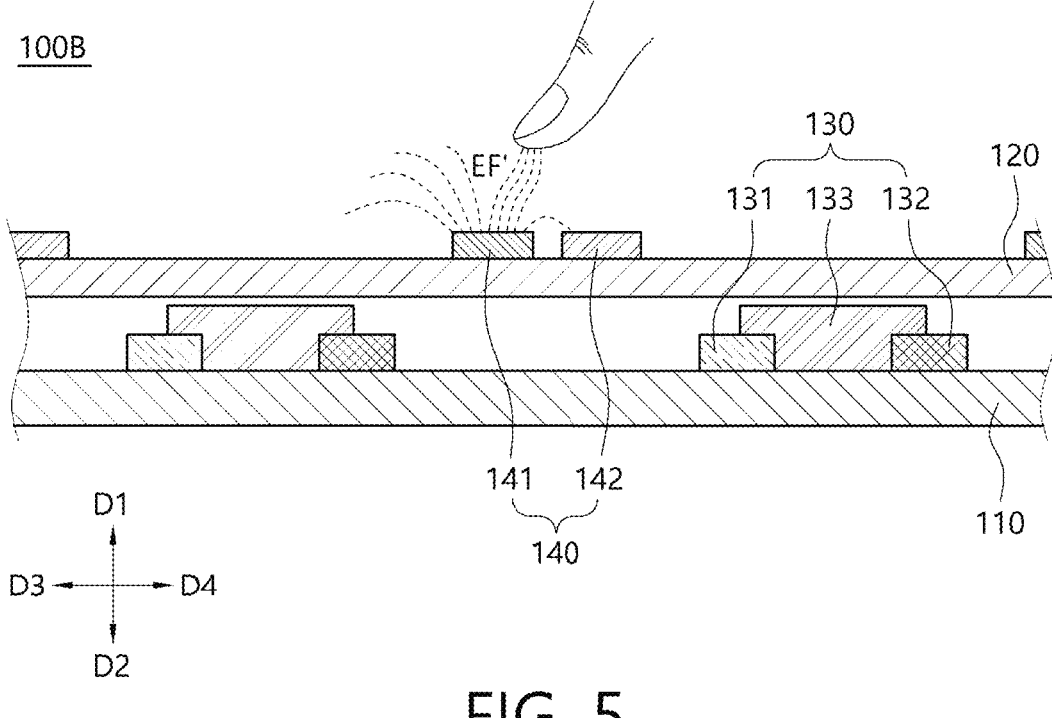
FIG. 5 is a side cross-sectional view illustrating a hovering movement state on the heater (100B) according to the second embodiment of the present invention.

FIGS. 2 and 4 are side cross-sectional views illustrating heaters 100A and 100B according to first and second embodiments of the present invention, and FIGS. 3 and 5 are side cross-sectional views illustrating hovering movement state on the heater 100A of the heaters 100A and 100B according to the first and second embodiments of the present invention.

The heater 100 is a heating component and may be a film heater. That is, the heater 100 may be a film-type radiation heater which receives power (hereinafter, referred to as "heater power") from the power supply 200 under the control of the controller 300, generates heat, and emits radiant heat to the outside.

Referring to FIGS. 2 to 4, the heater 100 may include a first base material 110 and a second base material 120 which are spaced apart from each other in vertical directions D1 and D2, and the first base material 110 and the second base material 120 may each have an internal structure provided in an internal space.

That is, the first base material 110 and the second base material 120 may be base materials for protecting the heater 100 from an external environment while providing support forces for the internal structures. A flexible insulating plastic material may be used as the first base material 110 and the second base material 120.

The first base material 110 and the second base material 120 may be appropriately selected according to the field to which the heater 100 is applied or a heating temperature thereof.

Meanwhile, the internal structures are components disposed in the internal space formed by the first base material 110 and the second base material 120 and includes a heating part 130 for performing a heating function and a sensor part 140 for detecting an input of a hovering movement by a user or the like. In addition, the internal structure may further include a coverlay 102 covering the heating part 130. Of course, the sensor part 140 may be disposed on the second base material 120. In this case, the hovering movement may mean that an input part such as a hand of the user are located or moved at a distance slightly away from the first base material 110 or the second base material 120 without direct contact therewith. In addition, detection of the hovering movement may mean recognizing the hovering movement.

Specifically, the heating part 130 includes first and second heater electrode patterns 131 and 132 configured to receive heater power for heating from the power supply 200, and a plurality of sheet-type heating bodies 133 electrically connected to the first and second heater electrode patterns 131 and 132.

Figure 6:
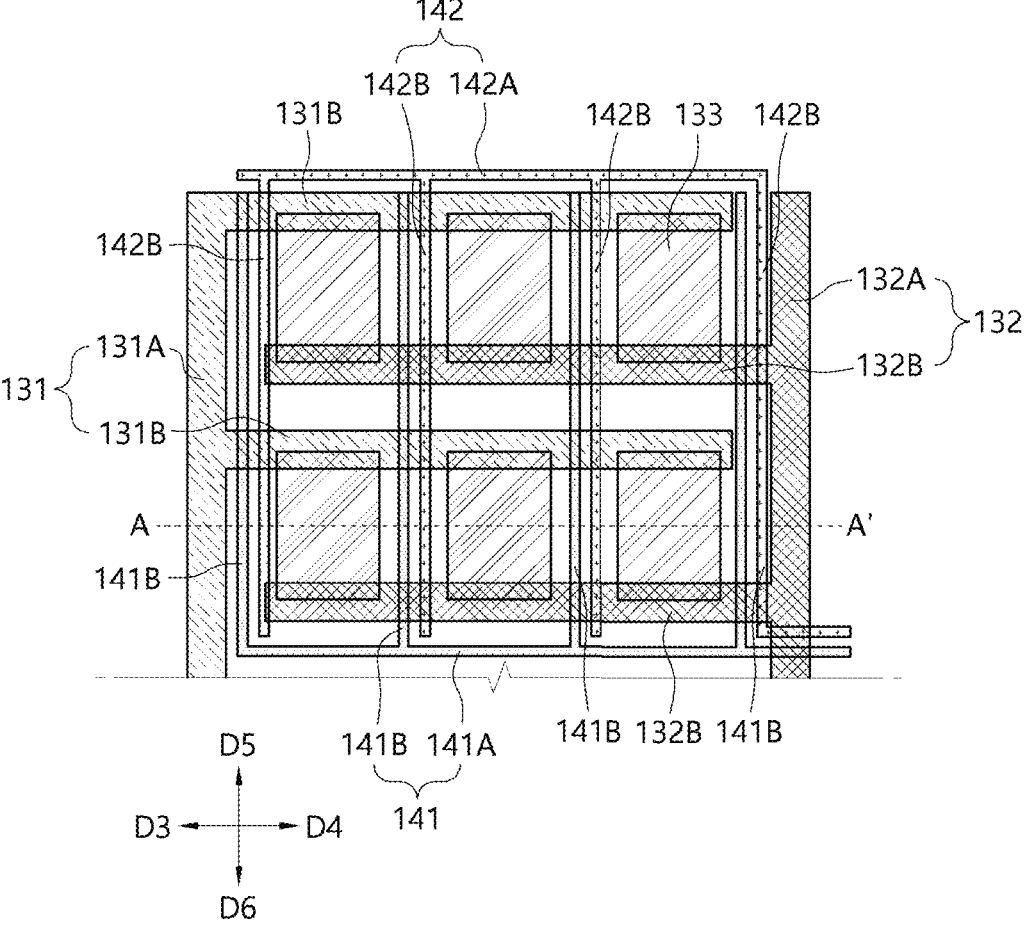
FIG. 6 is a plan cross-sectional view illustrating a first example of heater electrode patterns (131 and 132), a sheet-type heating body (133), and capacitive patterns (141 and 142) among components of the heaters (100A and 100B) according to the first and second embodiments of the present invention.
Figure 7:
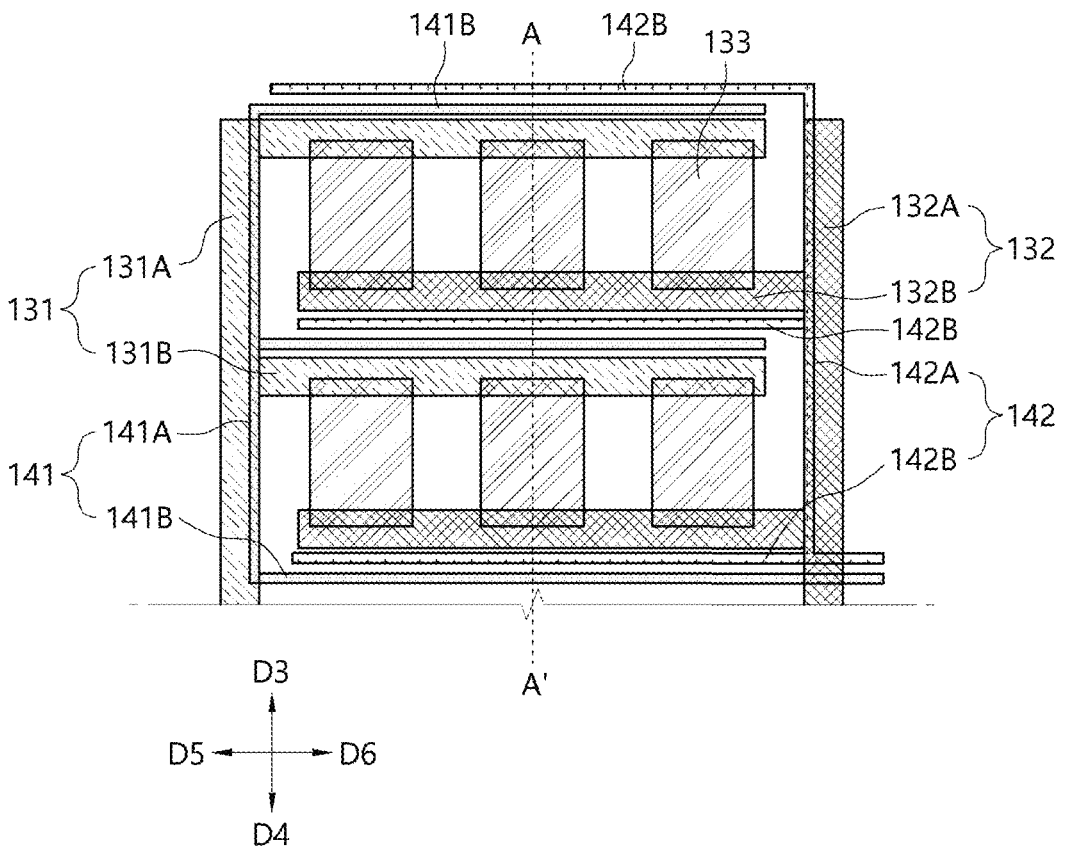
FIG. 7 is a plan cross-sectional view illustrating a second example of the heater electrode patterns (131 and 132), the sheet-type heating body (133), and the capacitive patterns (141 and 142) among the components of the heaters (100A and 100B) according to the first and second embodiments of the present invention.

FIG. 6 and FIG. 7 are plan cross-sectional views illustrating first and second examples of the heater electrode patterns 131 and 132, the sheet-type heating body 133, and the capacitive patterns 141 and 142 among components of the heaters 100A and 100B according to the first and second embodiments of the present invention. In this case, some of side cross sections of the heaters 100A and 100B according to the first and second embodiments of the present invention of the cross-sections taken along line A-A' in FIGS. 6 and 7 may be shown as in FIGS. 2 to 5. However, in the case of some of the side cross-sections of the heaters 100A and 100B according to the first and second embodiments of the present invention according to the cross-section of FIG. 6, the heater electrode patterns 131 and 132 may be in a state of not being shown in FIGS. 2 to 5.

That is, the first and second heater electrode patterns (or referred to as "first and second heater electrodes") 131 and 132 are electrode patterns to which heater power is applied, may be formed on the first base material 110, and may supply the applied heater power to each sheet-type heating body 133. The heater electrode patterns 131 and 132 may each be formed of a conductive material and may be formed of a metal material so as to minimize a voltage drop.

The first and second heater electrode patterns 131 and 132 may each be formed through an etching method using a metal foil or a printing process using a metal paste. That is, the first and second heater electrode patterns 131 and 132 may be formed by laminating a metal foil on an upper surface of the first base material 110 and then patterning the metal foil using an etching method. Alternatively, the first and second heater electrode patterns 131 and 132 may each be formed by printing a metal paste, such as silver, aluminum, copper, nickel, stainless steel, or an alloy thereof, on the upper surface of the first base material 110. However, the first and second heater electrode patterns 131 and 132 may be formed using various processes in addition to the above-described processes.

Each of the first and second heater electrode patterns 131 and 132 includes main electrodes 131A and 132A, and a plurality of branch electrodes 131B and 132B branching from the main electrodes 131A and 132A. Of course, the main electrodes 131A and 132A may be a plurality of electrodes and may have a form branching from any electrode. A gap distance between the branch electrodes 131B and 132B may be shorter than a gap distance between the main electrodes 131A and 132A. This is because the heating body 133 is disposed between the branch electrodes 131B and 132B. For example, the heater electrode patterns 131 and 132 may include various patterns such as an interdigitated pattern and the like, but the present invention is not limited thereto.

The first and second heater electrode patterns 131 and 132, in particular, the first and second branch electrodes 131B and 132B are respectively connected to the plurality of sheet-type heating bodies 133 to apply the supplied heater power to each of the sheet-type heating bodies 133. In this case, the first heater electrode pattern 131 and the second heater electrode pattern 132 are disposed to be spaced apart from each other, and different voltages may be applied to the first heater electrode pattern 131 and the second heater electrode pattern 132. For example, a high voltage may be applied to the first heater electrode pattern 131 and a low voltage may be applied to the second heater electrode pattern 132, or conversely, a low voltage may be applied to the first heater electrode pattern 131 and a high voltage may be applied to the second heater electrode pattern 132, and a corresponding high voltage and a corresponding low voltage may each be a direct-current (DC) voltage. In this case, each sheet-type heating body 133 is disposed between the first heater electrode pattern 131 and the second heater electrode pattern 132, particularly, between the first branch electrode

131B and the second branch electrode 132B and may be electrically connected to the first heater electrode pattern 131 and the second heater electrode pattern 132 in parallel. Accordingly, heat may be generated in each sheet-type heating body 133 as a current flows according to voltages applied through the first heater electrode pattern 131 and the second heater electrode pattern 132.

The plurality of sheet-type heating bodies 133 are components for generating heat according to the applied heater power, may be formed on the first and second heater electrode patterns 131 and 132 through a process of printing a heating body composition, and may have uniform spaced gaps in horizontal directions D3, D4, D5, and D6.

For example, each sheet-type heating body 133 may be formed by printing a heating body composition (containing, for example, conductive particles including carbon nanotube particles and graphite particles) to be electrically connected to the first and second heater electrode patterns 131 and 132, and drying and curing the heating body composition. In this case, screen printing, gravure printing (or roll-to-roll gravure printing), comma coating (or roll-to-roll comma coating), flexo, imprinting, offset printing, or the like may be used as the printing method of the heating body composition, but the present invention is not limited thereto. In addition, the drying and the curing may be performed at a temperature ranging from 100° C. to 180° C., but the present invention is not limited thereto.

The plurality of sheet-type heating bodies 133 may be disposed to be spaced apart from each other in a horizontal direction on the first base material 110 and may each be electrically connected to the first and second heater electrode patterns 131 and 132, that is, the first and second branch electrodes 131B and 132B, in parallel. In this case, the sheet-type heating bodies 133 may form n rows and m columns, and each of n and m is a natural number that is greater than or equal to one. However, when n is one, m may be greater than or equal to two, whereas, when m is one, n may be greater than or equal to two. In addition, an example in which the sheet-type heating bodies 133 are illustrated in two rows and three columns is shown FIGS. 6 and 7, but the present invention is not limited thereto.

The heating body composition forming each sheet-type heating body 133 may include a mixed binder and conductive particles. However, in order to form the sheet-type heating body 133, the heating body composition put into the printing process may further include an organic solvent and a dispersant in addition to the mixed binder and the conductive particles.

For example, the heating body composition may include 5 to 30 parts by weight of the mixed binder, 0.7 to 60 parts by weight of the conductive particles, 29 to 80 parts by weight of the organic solvent, and 0.5 to 5 parts by weight of the dispersant based on 100 parts by weight of the heating body composition, but the present invention is not limited thereto.

The conductive particle may include a carbon particle or a metal powder, which has conductivity. One or more among a carbon nanotube particle, carbon black, and a graphite particle may be used as the carbon particle. One or more among powders of silver, copper, and nickel may be used as the metal powder. For example, the conductive particles may include 0.1 to 5 parts by weight of the carbon nanotube particle, 0.1 to 20 parts by weight of the graphite particle, or 10 to 60 parts by weight of the metal powder based on 100 parts by weight of the heating body composition, but the present invention is not limited thereto.

The carbon nanotube particle may be selected from single-wall carbon nanotubes, double-wall carbon nanotubes, multi-wall carbon nanotubes, or a mixture thereof. For example, the carbon nanotube particle may be multi-wall carbon nanotubes. When the carbon nanotube particle is the multi-wall carbon nanotubes, a diameter thereof may range from 1 nm to 20 nm, and a length thereof may range from 1 μm to 100 μm, but the present invention is not limited thereto. In addition, a diameter of the graphite particle may range from 1 μm to 25 μm and a thickness thereof may range from 1 nm to 25 μm, but the present invention is not limited thereto.

The metal powder may include a powder of silver, copper, or nickel. A silver powder may have a form of a flake, a sphere, a polygonal plate shape, or a rod. A silver (Ag)-coated copper (Cu) powder, a nickel (Ni)-coated Cu powder, or the like may be used as the copper powder. In addition, an Ag-coated Ni powder may be used as the nickel powder.

When the sheet-type heating body 133 is formed using a heating body composition including carbon particles and a metal powder, the metal powder may form a main electrical network, and a space between the metal powders may be filled with the carbon particles to form a three-dimensional random network structure.

As described above, when the heating body composition includes the carbon particles and the metal powder, energy efficiency and a heat generation rate of the sheet-type heating body 133 may be increased. Generally, since the metal powder does not have a blackbody radiation function, the blackbody radiation function may be implemented by including the carbon particles in the heating body composition. That is, due to the carbon particles, heat resistance of the sheet-type heating body 133 may be increased, and the heat generation rate and energy efficiency of the sheet-type heating body 133 may be increased.

Resistivity of each sheet-type heating body 133 may be determined by a content of the carbon particles or the metal powder in the total solid content. For example, the resistivity may be controlled only with the carbon particles up to the range of $1 \times 10^{-2}$ Ωcm, but additional introduction of the metal powder is required for a range below the above range. Each sheet-type heating body 133 may have resistivity ranging from $9 \times 10^{-2}$ Ωcm to $1.1 \times 10^{-3}$ Ωcm.

In order to have heat resistance even at a temperature of about 300° C., the mixed binder may include at least two among a phenol-based resin, an acetal-based resin, an isocyanate-based resin, and an epoxy-based resin. For example, the mixed binder may include at least two among epoxy, epoxy acrylate, hexamethylene diisocyanate, polyvinyl acetal, and a phenol-based resin. In this case, the mixed binder may include 10 to 150 parts by weight of a polyvinyl acetal resin and 100 to 500 parts by weight of a phenolic resin based on 100 parts by weight of epoxy acrylate or hexamethylene diisocyanate. When the amount of the phenol-based resin is 100 parts by weight or less based on 100 parts by weight of epoxy acrylate or hexamethylene diisocyanate, heat resistance may be degraded, and when the amount of the phenol-based resin exceeds 500 parts by weight based on 100 parts by weight of epoxy acrylate or hexamethylene diisocyanate, flexibility of the sheet-type heating body 133 is degraded so that brittleness may become stronger.

In this way, by increasing the heat resistance of the mixed binder, even when the sheet-type heating body 133 generates heat at a high temperature of about 300° C., it is possible to suppress a change in resistance or damage of the sheet-type heating body 133.

Here, the phenol-based resin means a phenol-based compound including phenol and a phenol derivative. The organic solvent is for dispersing the conductive particles and the mixed binder may be a mixed solvent of two or more selected from carbitol acetate, butyl carbitol acetate, dibasic ester (DBE), ethyl carbitol, ethyl carbitol acetate, dipropylene glycol methyl ether, cellosolve acetate, butyl cellosolve acetate, butanol, and octanol.

Meanwhile, various commonly used methods may be applied to a dispersion process. For example, ultrasonic treatment (ultra-sonication), a roll mill process, a bead mill process, or a ball mill process may be applied, but the present invention is not limited thereto.

The dispersant is for more smoothly dispersing the conductive particles, and a conventional dispersant such as BYK used in the art, an amphoteric surfactant such as Triton X-100, or an ionic surfactant such as SDS may be used as the dispersant.

In addition, the heating body composition may further include 0.1 to 5 parts by weight of a silane coupling agent as an additive based on 100 parts by weight of the heating body composition.

The silane coupling agent serves as an adhesion promoter to promote adhesive strength between the resins when the heating body composition is mixed. The silane coupling agent may be epoxy-containing silane or mercapto-containing silane.

In addition, the heating body composition may further include 0.5 to 20 parts by weight of ceramic particles as an additive based on 100 parts by weight of the heating body composition. In this case, the ceramic particles increase a heat capacity of the sheet-type heating body 133. Glass particles, silicon particles, or the like may be used as the ceramic particles.

When formed using the above-described heating body composition, the sheet-type heating body 133 has an advantage of being able to rapidly radiate a high temperature even when low power ranging from DC 8 V to DC 18 V is applied. In this case, the heat generated from each sheet-type heating body 133 may be discharged to the outside through the first base material 110 or the second base material 120.

Meanwhile, the internal structure may further include the coverlay 102 covering the heating part 130. That is, the coverlay 102 is a component for filling an area in which the heater electrode patterns 131 and 132 and the plurality of sheet-type heating bodies 133 are formed and covering these components. Accordingly, when external foreign materials are introduced into an internal space of the heater 100, the coverlay 102 may serve to minimize introduction of the foreign materials into the heating part 130, that is, the heater electrode patterns 131 and 132, and the sheet-type heating body 133 and to prevent the heating part 130 from being damaged due to an external force. In addition, the coverlay 102 may serve to block (insulate) an electrical connection which may occur between adjacent sheet-type heating bodies 133 or between adjacent heater electrode patterns 131 and 132.

For example, the coverlay 102 may be implemented as an insulating film base material or may be formed through printing of a liquid material, screen printing, or the like, but the present invention is not limited thereto. In particular, according to the present invention, the coverlay 102 may include a plurality of hollows 101 which are empty areas. That is, each hollow 101 may be a hole area formed in the film base material or an area in which a print is not formed during the printing process. At least a portion of the sensor part 140 may be formed in the hollow 101. That is, at least a portion of each of first and second branch lines 141B and 142B may pass through a gap area, particularly, the hollow 101.

Next, the sensor part 140 is a component for detecting a hovering movement which occurs in an upper portion of the inner space of the heater 100, particularly, an area between the sheet-type heating bodies 133 (hereinafter, referred to as a "gap area"). In this case, the gap area between the sheet-type heating bodies 133 is the internal space of the heater 100 in which the sheet-type heating body 133 is not formed and may include the hollow 101. That is, the sensor part 140 includes first and second capacitive patterns 141 and 142 (or referred to as "first and second lines") in which capacitance changes according to the hovering movement occur on the second base material 120 in the gap area. In this case, the first and second capacitive patterns 141 and 142 may be disposed to be spaced apart from each other in the horizontal direction. Alternatively, the first and second capacitive patterns 141 and 142 may be disposed to be spaced apart from the first and second heater electrode patterns 131 and 132 in the vertical direction. Alternatively, in addition to the hovering movement, a capacitance change may occur in the first and second capacitive patterns 141 and 142 due to a direct touch. However, hereinafter, for convenience of description, a description will be made to limit in a capacitance change according to the hovering movement, but the present invention is not limited thereto, and a capacitance change due to a direct touch may be included.

The first and second capacitive patterns 141 and 142 include main lines 141A and 142A, and a plurality of branch lines 141B and 142B branching from the main lines 141A and 142A. Of course, the main lines 141A and 142A may be a plurality of main lines and may have a form branching from any line. Of course, a separation distance between the branch lines 141B and 142B may be shorter than a separation distance between the main lines 141A and 142A. This is because the capacitance change should mainly occur between the branch lines 141B and 142B according to the hovering movement. For example, the capacitive patterns 141 and 142 may include various patterns such as an interdigitated pattern and the like, but the present invention is not limited thereto.

The branch lines 141B and 142B may be disposed in parallel with (see FIG. 7) or perpendicular to (see FIG. 6) the branch electrodes 131B and 132B. In this case, during the parallel or vertical arrangement, the branch lines 141B and 142B may pass through upper and lower areas of the branch electrodes 131B and 132B (see FIG. 6). Alternatively, during the parallel arrangement, the branch lines 141B and 142B may not pass through the upper and lower areas of the branch electrodes 131B and 132B (see FIG. 7).

Power of different voltages/currents may be provided to the first and second capacitive patterns 141 and 142, or power may be provided to only one of the first and second capacitive patterns 141 and 142. For example, a high voltage may be applied to the first capacitive pattern 141 and a low voltage is applied (or no voltage is applied) to the second capacitive pattern 142, or the low voltage may be applied (or no voltage is applied) to the first capacitive pattern 141 and the high voltage may be applied to the second capacitive pattern 142, and the high voltage and the low voltage may be DC voltages, but the present invention is not limited thereto.

Accordingly, as shown in FIGS. 2 and 4, an electric field EF according to corresponding power may be formed on the second base material 120. In this case, when the hovering movement is performed by a finger of the user on the second base material 120, as shown in FIGS. 3 and 5, the electric field EF' changes and thus a corresponding capacitance change occurs, and the controller 300 may recognize the capacitance change.

In particular, since the hovering movement occurring above each gap area should be detected, the first and second branch lines 141B and 142B may be disposed to pass through the gap area between the sheet-type heating bodies 133. In addition, for uniform detection on the hovering movement, the first and second branch lines 141B and 142B are disposed in parallel with each other in each gap area, and the arrangement interval may be kept constant.

Accordingly, for the hovering movement occurring on the second base material 120 above the gap area, a capacitance change may occur in the first and second branch lines 141B and 142B passing the gap area. In particular, in order to increase recognition of the hovering movement, a capacitance change area may be provided as a plurality of capacitance change areas. That is, the plurality of first and second branch lines 141B and 142B may be disposed to pass through the plurality of gap areas.

The first and second capacitive patterns 141 and 142 may be disposed as internal structures between the first base material 110 and the second base material 120 (see FIGS. 2 and 3), and alternatively, in order to increase a rate of the capacitance change, the first and second capacitive patterns 141 and 142 may be disposed even on the second base material 120 (see FIGS. 4 and 5). Of course, when disposed on the second base material 120, in order to reduce an influence of an external environmental, the first and second capacitive patterns 141 and 142 may be each formed to have a thickness (or a height) that is smaller than that when the internal structures are disposed as the first and second capacitive patterns 141 and 142.

In addition, when the internal structures are disposed as the first and second capacitive patterns 141 and 142, the first and second capacitive patterns 141 and 142 may be disposed to be closer to any one base material of the first and second base materials 110 and 120. That is, the first and second capacitive patterns 141 and 142 may be formed on an upper surface of the first base material 110 or a lower surface of the second base material 120. Alternatively, as shown in FIG. 2 and the like, the first and second capacitive patterns 141 and 142 may be formed to be in contact with both the upper surface of the first base material 110 and the lower surface of the second base material 120.

On the other hand, since portions in which the branch lines 141B and 142B are disposed, that is, portions in which the capacitance change occurs correspond to the gap areas (for example, areas of the hollows 101) spaced apart from the area in which the sheet-type heating body 133 is formed, the present invention has an advantage of being able to prevent a problem, which may occur between the branch lines 141B and 142B and the sheet-type heating body 133, in advance.

The first and second capacitive patterns 141 and 142 may be formed through a flexible copper clad laminate (FCCL) process, a printing process, or the like. For example, screen printing, gravure printing (or roll-to-roll gravure printing), comma coating (or roll-to-roll comma coating), flexo, imprinting, offset printing, or the like may be used as the printing method, but the present invention is not limited thereto.

In addition, the first and second capacitive patterns 141 and 142 may each include a conductive material such as a carbon material, a metal material, or the like, and the first and second capacitive patterns 141 and 142 may be formed of the same material or different materials.

In the case of a heater structure in a conventional heater device, since a sensor part implemented in the outside of the film heater through an additional base material is implemented as a separate configuration in an upper portion or a lower portion of the heater device, there is a problem in that a thickness of the film heater is increased and a manufacturing cost thereof is increased. However, according to the present invention, the capacitive patterns 141 and 142 are provided inside the heater 100 or on the second base material 120 without an additional base material configuration so that the problem of the prior art can be solved. As a result, according to the present invention, there is an advantage of being able to realize the heater 100 having a minimized thickness and reducing the number of manufacturing processes to reduce a manufacturing cost of the heater 100.

Meanwhile, due to heat generated from the heaters 100A and 100B according to the first and second embodiments of the present invention, radiant heat is emitted to upper and lower surfaces of the heaters 100A and 100B. In this case, the radiant heat emitted to any one surface of the upper and lower surfaces (hereinafter referred to as a "first surface") provides a feeling of warmth to the user or an object, but the radiant heat emitted to the other surface of the upper and lower surfaces (hereinafter referred to as a "second surface") may be a wasted factor.

In order to solve the above problem, the heater 100 may further include a reflector (not shown). That is, the heater 100 may include a reflector on an inner surface or an outer surface of the first base material 110 or the second base material 120 having the second surface. Alternatively, another layer may be formed between the reflector and the inner surface or outer surface.

Since the reflector is capable of reflecting the radiant heat emitted from the second surface to the first surface, radiation efficiency of the heater 100 can be improved by suppressing waste of the radiant heat. For example, a metal material which reflects radiant heat well, such as aluminum or stainless steel, may be used as a material of the reflector, but the present invention is not limited thereto.

Next, the power supply 200 supplies power to each component of the heater device according to one embodiment of the present invention, which requires power, under the control of the controller 300. In particular, the power supply 200 may supply heater power required for driving of the heater 100. For example, the power supply 200 may supply various amounts of DC power and include a lead acid battery, a secondary battery, a supercapacitor, and the like, but the present invention is not limited thereto.

Next, the controller 300 controls an operation of each component of the heater device according to one embodiment of the present invention. For example, the controller 300 may include a processor or a process which is software executed in a corresponding processor, but the present invention is not limited thereto. In particular, the controller 300 may control the heater power supplied to the sheet-type heating bodies 133 through the heater electrode patterns 131 and 132 in response to the capacitance change of the sensor part 140. In particular, the controller 300 may recognize the performed hovering movement, and when it is determined that the recognized operation is a specific operation, the controller 300 may control the heater power supplied to the sheet-type heating bodies 133. In this case, the operation of controlling the heater power may include an on operation, an off operation, a temperature increase operation, a temperature decrease operation, and a temperature maintenance operation and may include other operations in addition to the above operations.

For example, the controller 300 may perform switch control for switching a supply of the power from the power supply 200 to the heater 100 at every time a first hovering movement is recognized and turn a switch on when the first hovering movement is recognized, and then turn the switch off when the first hovering movement is recognized again, but the present invention is not limited thereto. In addition, when a second hovering movement is recognized, the controller 300 may control to reduce or increase an intensity of the heater power applied to the heater 100 to lower or raise a heating temperature of the heater 100. For example, the first hovering movement or the second hovering movement may include various operations such as an operation of moving over a predetermined length in one direction, a zigzag operation, an operation of drawing a circle, an operation for drawing a polygon, an operation for opening and closing a fist, an operation for opening a hand and clenching a fist.

Meanwhile, when a human body comes into contact with a surface from which radiant heat of the heater 100 is emitted for a short period of time, there is no risk of burns, and when the human body comes into contact with the surface from which the radiant heat of the heater 100 is emitted for a long period of time, low-temperature burns may occur. Accordingly, the controller 300 may perform the control in consideration of the low-temperature burns. That is, since the low-temperature burns do not occur immediately when the human body comes into contact with the heater 100 to apply a pressure, the controller 300 may control the heating temperature of the heater 100 in consideration of a time when the low-temperature burns occur according to a contact time. Therefore, even when a contact is detected within a predetermined period of time when there is no concern of low-temperature burns, the controller 300 may control the heater 100 to be maintained on a driving state. In addition, when a capacitance change state of a reference area or more is continuously maintained, the controller 300 may determine that the human body or the like continuously comes into contact with the heater 100 to control a heating temperature of the heater 100 to be lowered. Thereafter, when the corresponding state is removed, the controller 300 may control the heater power to be normally supplied to the heater 100 again.

Meanwhile, the heater device according to one embodiment of the present invention may further include an alarm member (not shown). That is, the alarm member is a member which outputs visual signals (e.g., light and the like), sound signals (e.g., a warning sound and the like), or tactile signals (e.g., vibration and the like) and may be controlled by the controller 300. For example, the alarm member may output warning about a concern on low-temperature burns to the heater 100.

As described above, the heater device according to one embodiment of the present invention is capable of suppressing low-temperature burns due to a contact for a long period of time by controlling the heating temperature of the heater 100 when a portion of the human body comes into contact with the heater 100 for a predetermined time or more.

Next, a process of manufacturing the heaters 100A and 100B according to the first and second embodiments of the present invention will be described.

Figure 8:
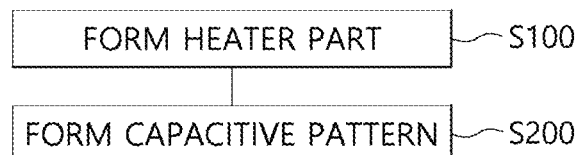
FIG. 8 is a flowchart illustrating a process of manufacturing the heaters (100A and 100B) according to the first and second embodiments of the present invention.

FIG. 8 is a flowchart illustrating the process of manufacturing the heaters 100A and 100B according to the first and second embodiments of the present invention.

The process of manufacturing the heaters 100A and 100B according to the first and second embodiments of the present invention may include operations S100 and S200 as shown in FIG. 8. However, since the description of each configuration of the heaters 100A and 100B according to the first and second embodiments of the present invention has been described with reference to FIGS. 1 to 7, the description will be omitted herein.

FIGS. 9A-9E are more detailed diagrams illustrating the process of manufacturing the heater 100A according to a sequence according to the first embodiment of the present invention, and FIGS. 10A-10D are more detailed diagrams illustrating the process of manufacturing the heater 100B according to a sequence according to the second embodiment of the present invention. That is, FIGS. 9A, 9B, 9C, 10A, and 10B show operation S100, and FIGS. 9D, 9E, 10C, and 10D show operation S200.

Figure 9A:
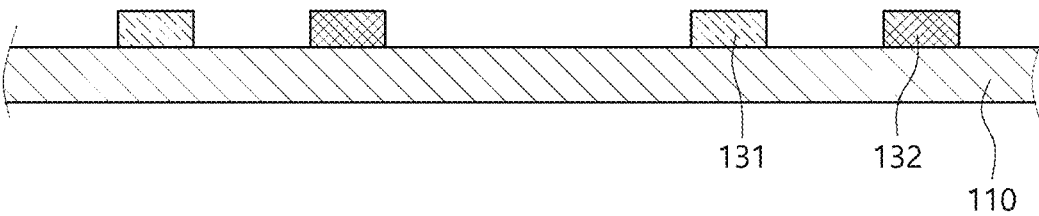
FIGS. 9A-9E are more detailed diagrams illustrating the process of manufacturing the heater (100A) according to a sequence according to the first embodiment of the present invention.
Figure 9B:
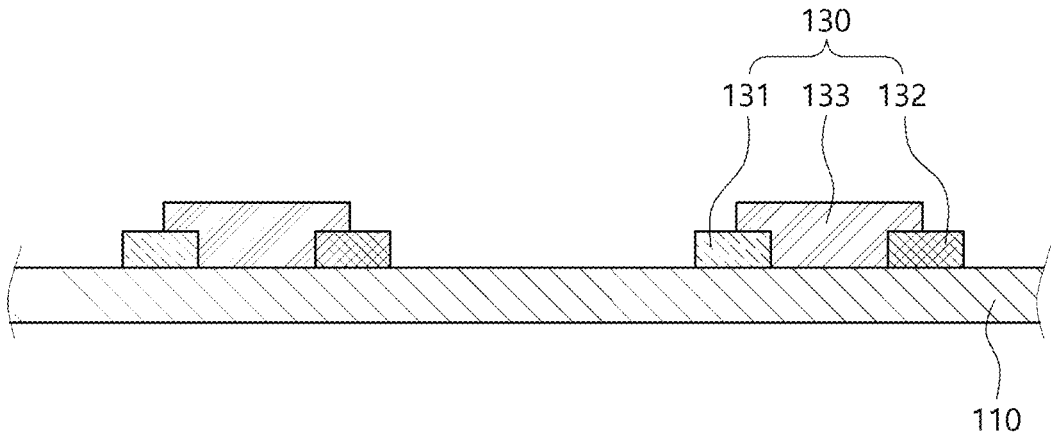
Figure 9C:
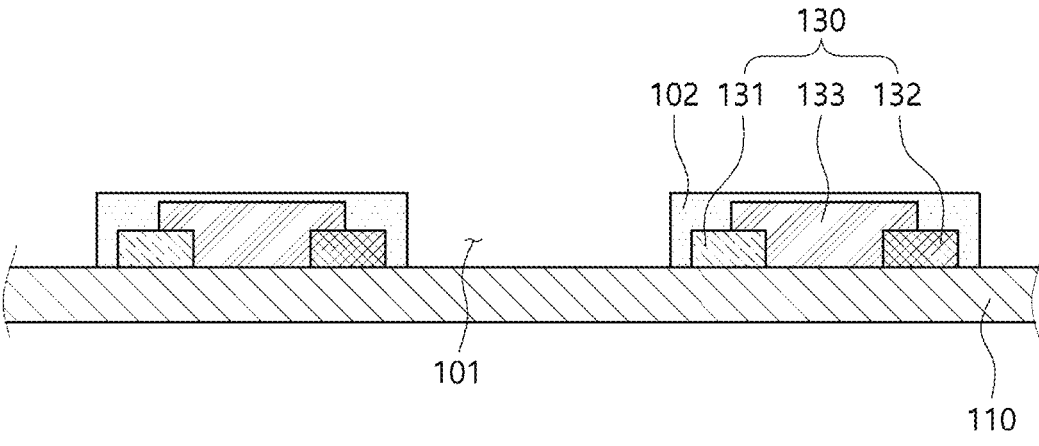
Figure 10A:
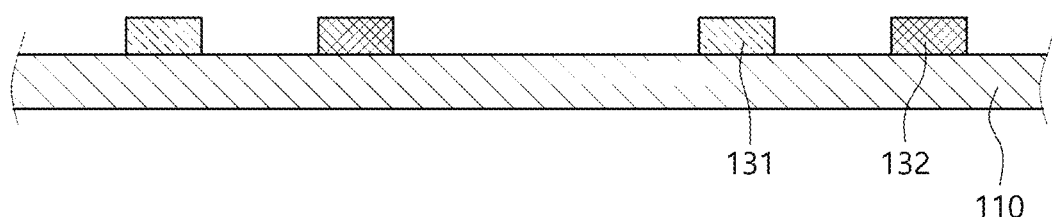
FIGS. 10A-10D are more detailed diagrams illustrating the process of manufacturing the heater (100B) according to a sequence according to the second embodiment of the present invention.
Figure 10B:
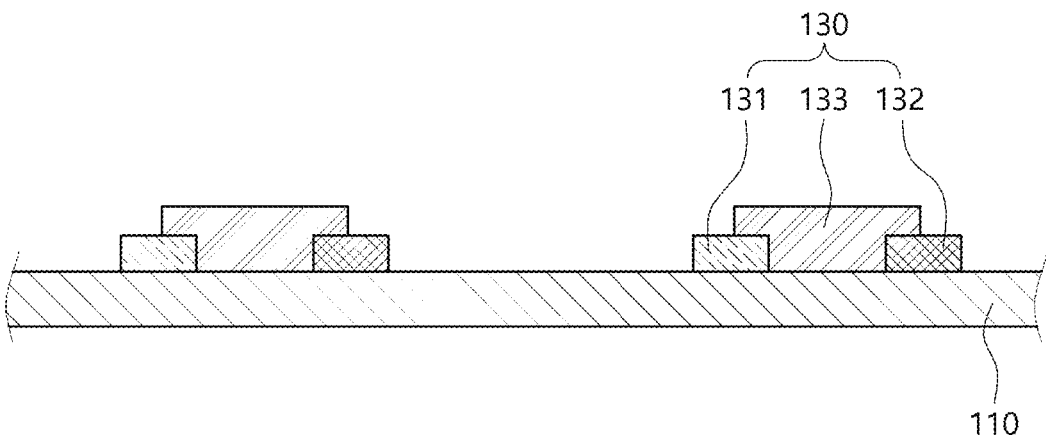

In operation S100, the heating part 130 is formed. That is, as shown in FIGS. 9A and 10A, the heater electrode patterns 131 and 132 are formed on the first base material 110. Thereafter, as shown in FIGS. 9B and 10B, the plurality of sheet-type heating bodies 133 electrically connected to the heater electrode patterns 131 and 132 are formed. Then, as shown in FIG. 9C, an insulating coverlay 102 may be formed to cover an area in which the heater electrode patterns 131 and 132 and the plurality of sheet-type heating bodies 133 are formed. In this case, the coverlay 102 may be formed such that a plurality of hollows 101 are included in a gap area between the sheet-type heating bodies 133. However, the formation of the corresponding coverlay 102 is an option and may not be formed as shown in FIGS. 10A-10D. However, the heaters 100A and 100B according to the first and second embodiments of the present invention are not limited thereto.

Figure 9D:
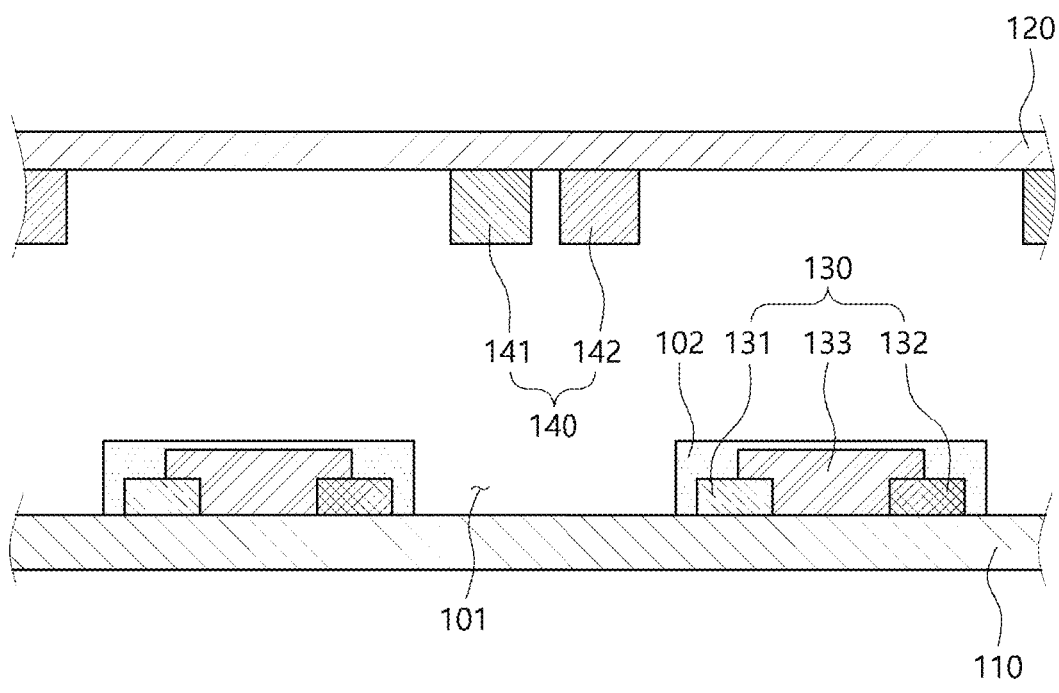
Figure 9E:
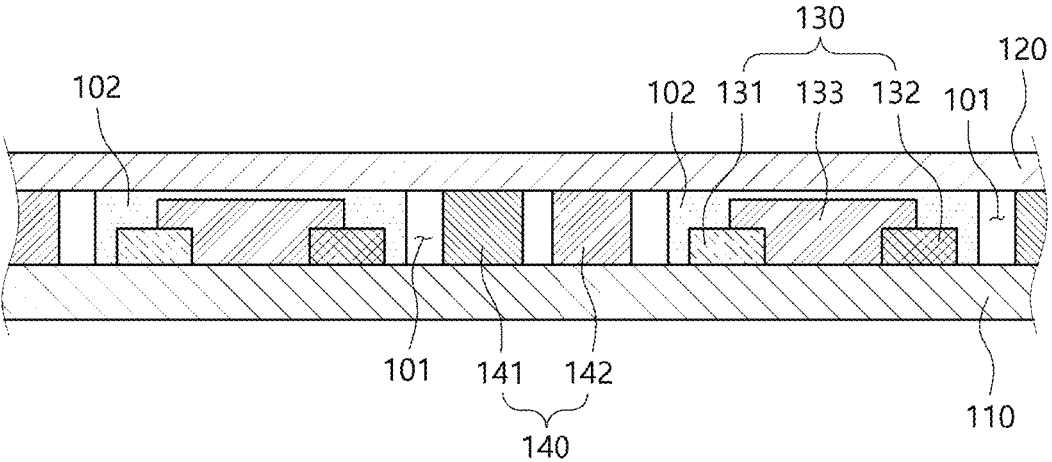
Figure 10C:
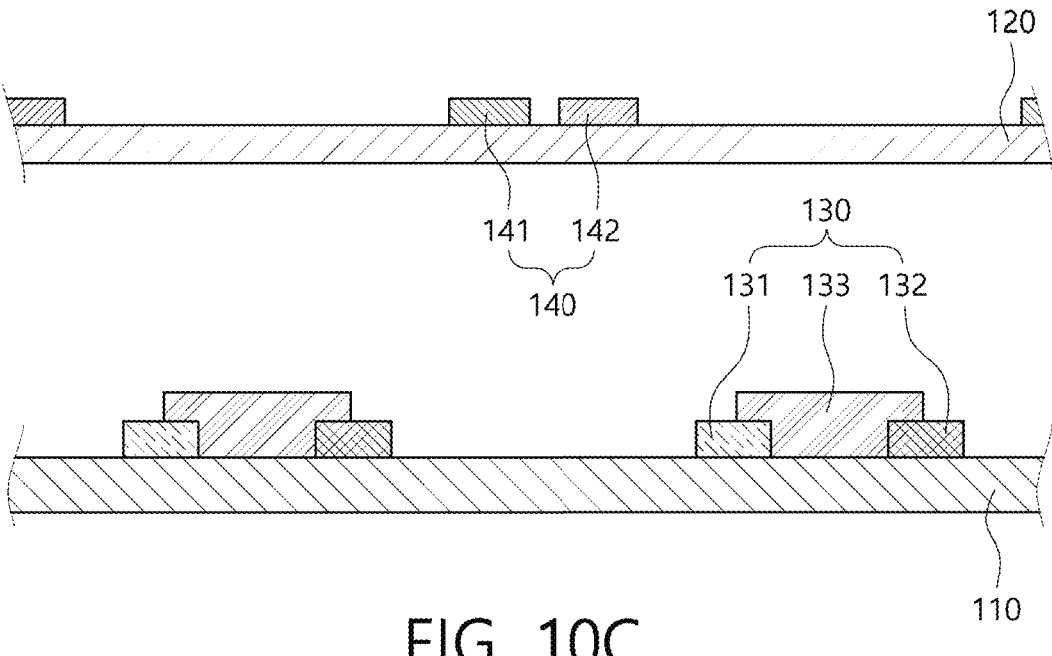
Figure 10D:
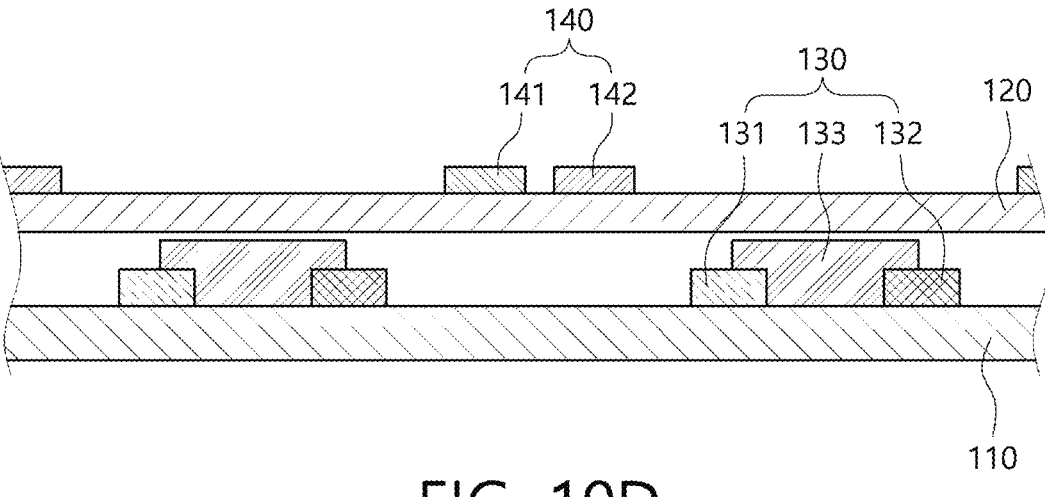

Thereafter, in operation S200, the sensor part 140 is formed in the gap area, particularly, in the hollow 101. That is, as shown in FIGS. 9D and 10C, the first and second capacitive patterns 141 are formed in a lower surface area or an upper surface area of the second base material 120 corresponding to the gap area, particularly, an area of the hollow 101. Thereafter, as shown in FIGS. 9E and 10D, the second base material 120 is laminated on the first base material 110 so that the second base material 120 is vertically spaced apart. When the coverlay 102 is formed, the second base material 120 may be bonded on the coverlay 102 of the first base material 110.

Alternatively, unlike shown in FIGS. 9A-9E, during the process of manufacturing the heater 100A according to the first embodiment of the present invention, in operation S200, the first and second capacitive patterns 141 and 142 are formed on the upper surface of the first base material 110 corresponding to the gap area, particularly, the area of the hollow 101, and then the second base material 120 may be laminated.

For example, when the second base material 120 is laminated on the first base material 110, in a state in which an adhesive forming an adhesive layer is applied on the coverlay 102 and the like, the second base material 120 may be bonded by covering the second base material 120 and applying heat and pressure, but the present invention is not limited thereto.

The present invention configured as described above has an advantage in that the user can control the power of the heater only with a hovering movement without a direct touch such as pressing of the heater, thereby improving the convenience to use.

In addition, according to the present invention, since the sensor part is formed such that the capacitive pattern is provided inside the heater or on the base material without a configuration of an additional base material, there is an advantage of being able to implement a heater with a more minimized thickness and to reduce the manufacturing cost by reducing the manufacturing processes.

In addition, according to the present invention, since the capacitive pattern in which the capacitance change occurs according to the hovering movement is disposed in the gap area to be spaced apart from the sheet-type heating body, there is an advantage of being able to prevent a problem that may occur between a corresponding capacitance pattern and the sheet-type heating body in advance and to suppress an increase in heat capacity due to the capacitive pattern.

In the detailed description of the present invention, although the specific embodiments have been described, various modifications are possible without departing from the scope of the present invention. Therefore, the scope of the present invention is not limited to the described embodiments and should be defined by the appended claims and equivalents thereof.

INDUSTRIAL APPLICABILITY

The present invention relates to a heater and an apparatus therefor, and since it is possible to provide a heater and an apparatus therefor in which a capacitive pattern for controlling power supplied to a heating body is implemented, the present invention has industrial applicability.

Statement Regarding Government Support Research or Development

[Unique Project ID] Not Assigned
[Project Number] RS-2024-00507617
[Ministry] Ministry of Trade, Industry and Energy of Republic of Korea
[Project Management (Specialized) Agency] Korea Planning & Evaluation Institute of Industrial Technology

[Research Project Name] Automotive Industry Technology Development (R&D)
[Research Project Title] Development of an integrated human-responsive heating system and a customized radiant heating solution for interior trim materials for the expanded application of high-efficiency heating systems in vehicles.
[Executing Agency Name] Seoyon Ewha Co., Ltd.
[Research Period] Sep. 1, 2024-Dec. 31, 2027

The invention claimed is:
1. A film shaped heater comprising:
a first base material and a second base material which are spaced apart in a vertical direction to have an internal space; and
an internal structure provided in the internal space,
wherein the internal structure comprises:
a first heater electrode pattern comprising:
a first main electrode extending horizontally in a first longitudinal direction, and
first branch electrodes branching from the first main electrode and extending horizontally in a second longitudinal direction perpendicular to the first longitudinal direction;

a second heater electrode pattern spaced horizontally from the first heater electrode pattern, and comprising:

a second main electrode extending horizontally in the first longitudinal direction and second branch electrodes branching from the second main electrode, extending horizontally in a third longitudinal direction opposite the second longitudinal direction, spaced apart from the first branch electrodes and alternating with the first branch electrodes;

sheet-type heating bodies connected to the first and second heater electrode patterns and spaced apart from each other, each of the sheet-type heating bodies being arranged between a corresponding one of the first branch electrodes and a corresponding one of the second branch electrodes, and each of the sheet-type heating bodies having a first end and a second end electrically connected to the corresponding first branch electrode and the corresponding second branch electrode, respectively;

a sensor comprising a capacitive pattern and configured to detect a capacitance change that occurs in gap areas between the sheet-type heating bodies in response to a user's hand movement at a distance away from the first base material or the second base material without direct contact with the first base material or the second base material;

insulating coverlays filling areas where the first and second branch electrodes and the sheet-type heating bodies are provided; and hollows disposed in areas where the insulating coverlays are not provided, wherein the capacitive pattern comprises:

a first line comprising:

a first main line extending horizontally in the first longitudinal direction, and first branch lines branching from the first main line and extending horizontally in the second longitudinal direction; and a second line spaced horizontally from the first line, and comprising:

a second main line extending horizontally in the first longitudinal direction, and second branch lines branching from the second main line, extending horizontally in the third longitudinal direction, spaced apart from the first branch lines and alternating with the first branch lines, wherein the first and second branch lines are arranged parallel to each other while passing through the gap areas, the first and second branch lines are arranged in the hollows where the insulating coverlays are not provided while overlapping the insulating coverlays when viewed in the first longitudinal direction, and the first and second branch lines do not overlap the first and second branch electrodes when viewed in the vertical direction while overlapping the first and second branch electrodes when viewed in the first longitudinal direction, wherein a distance between the first and second branch electrodes is shorter than a distance between the first and second main electrodes, wherein a distance between the first and second branch lines is shorter than a distance between the first and second main lines, and wherein heater power supplied to the sheet-type heating bodies through the first and second heater electrode patterns is capable of being controlled in response to the capacitance change.

2. A heater device comprising:

a power supply configured to supply heater power;

a first base material and a second base material which are spaced apart in a vertical direction to have an internal space;

an internal structure provided in the internal space; and a controller configured to control the heater power, wherein the internal structure comprises:

a first heater electrode pattern comprising:

a first main electrode extending horizontally in a first longitudinal direction, and first branch electrodes branching from the first main electrode and extending horizontally in a second longitudinal direction perpendicular to the first longitudinal direction;

a second heater electrode pattern spaced horizontally from the first heater electrode pattern, and comprising:

a second main electrode extending horizontally in the first longitudinal direction, and second branch electrodes branching from the second main electrode, extending horizontally in a third longitudinal direction opposite the second longitudinal direction, spaced apart from the first branch electrodes and alternating with the first branch electrodes;

sheet-type heating bodies connected to the first and second heater electrode patterns, and spaced apart from each other, each of the sheet-type heating bodies being arranged between a corresponding one of the first branch electrodes and a corresponding one of the second branch electrodes, and each of the sheet-type heating bodies having a first end and a second end electrically connected to the corresponding first branch electrode and the corresponding second branch electrode, respectively;

a sensor comprising a capacitive pattern and configured to detect a capacitance change that occurs in gap areas between the sheet-type heating bodies in response to a user's hand movement at a distance away from the first base material or the second base material without direct contact with the first base material or the second base material;

insulating coverlays filling areas where the first and second branch electrodes and the sheet-type heating bodies are provided; and hollows disposed in areas where the insulating coverlays are not provided, wherein the capacitive pattern comprises:

a first line comprising:

a first main line extending horizontally in the first longitudinal direction, and first branch lines branching from the first main line and extending horizontally in the second longitudinal direction; and a second line spaced horizontally from the first line, and comprising:

a second main line extending horizontally in the first longitudinal direction, and second branch lines branching from the second main line, extending horizontally in the third longitudinal direction, spaced apart from the first branch lines and alternating with the first branch lines, wherein the first and second branch lines are arranged parallel to each other while passing through the gap areas, the first and second branch lines are arranged in the hollows where the insulating coverlays are not provided while overlapping the insulating coverlays when viewed in the first longitudinal direction, and the first and second branch lines do not overlap the first and second branch electrodes when viewed in the vertical direction while overlapping the first and second branch electrodes when viewed in the first longitudinal direction, wherein a distance between the first and second branch electrodes is shorter than the distance between the first and second main electrodes, wherein a distance between the first and second branch lines is shorter than the distance between the first and second main lines in the gap areas, wherein the controller is configured to control the heater power supplied to the sheet-type heating bodies in response to the capacitance change, and wherein the sheet-type heating bodies comprise metal particles and carbon particles.

3. The heater of claim 1, wherein the heater power is controlled to be turned on in response to the user's hand movement once, and turned off in response to the user's hand movement again.

4. The heater of claim 1, wherein an intensity of the heater power is controlled to be reduced or increased in response to the user's hand movement that is recognized twice.

* * * * *